March 12, 1935. E. S. COOK 1,994,191
FLUID PRESSURE BRAKE
Filed Dec. 15, 1933
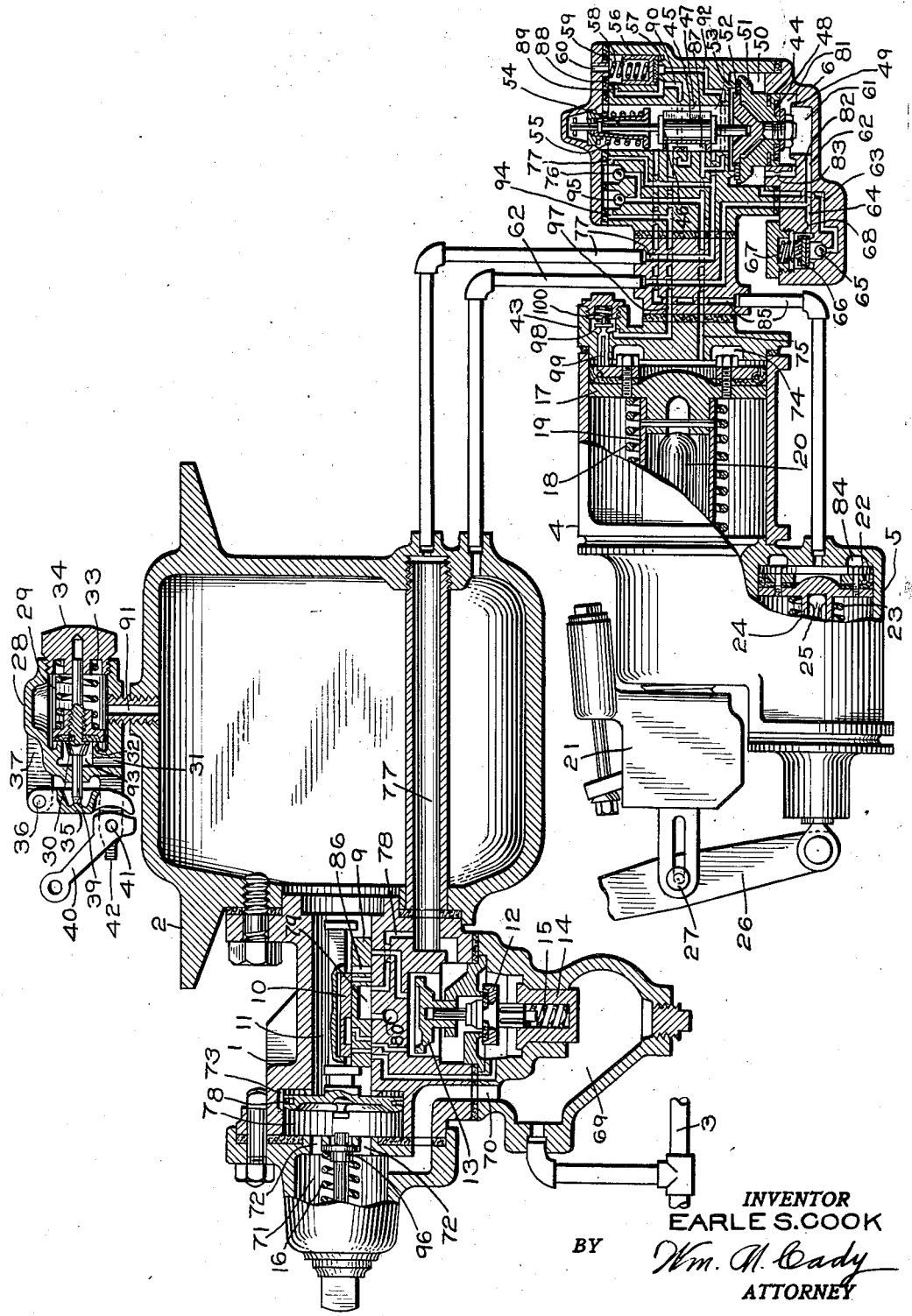
INVENTOR
EARLE S. COOK
BY Wm. A. Cady
ATTORNEY Patented Mar. 12, 1935

1,994,191

UNITED STATES PATENT OFFICE 1,994,191

FLUID PRESSURE BRAKE

Earle S. Cook, Wilkinsburg, Pa., assignor to The Westinghouse Air Brake Company, Wilmerding, Pa., a corporation of Pennsylvania Application December 15, 1933, Serial No. 702,531

3 Claims. (Cl. 303—68)

This invention relates to fluid pressure brakes and particularly to the type operated in accordance with variations in pressure in a brake pipe.

In setting out of a train a car equipped with the usual well known fluid pressure brake equipment, such as the K type, the angle cock in the brake pipe on the forward end of the train which is adjacent the car being set out is closed and the brake pipe hose connection is broken. Because of the consequent sudden venting of brake pipe pressure on that car, the triple valve device on said car moves to emergency position, compressing the usual graduating spring.

In order to release the brakes on the car set out, the trainman operates the usual auxiliary reservoir release valve device so as to vent fluid from the auxiliary reservoir. With the triple valve device in emergency position, fluid is then also vented from the brake cylinder, since the brake cylinder is in communication with the auxiliary reservoir by way of the emergency port in the main slide valve.

Fluid continues to be vented from the brake cylinder by way of the auxiliary reservoir until auxiliary reservoir pressure has been reduced sufficiently to permit the graduating spring to shift the triple valve piston and slide valve to emergency lap position. In emergency lap position, communication from the brake cylinder to the auxiliary reservoir is cut off, so that a further reduction in brake cylinder pressure is prevented.

It is undesirable to thus hold even a low pressure in the brake cylinder in the event that it is desired to repair the brake rigging or the brake equipment or to apply new brake shoes.

The principal object of my invention is to provide means for obviating the above mentioned difficulty.

The object is attained by providing a direct communication from the brake cylinder to the auxiliary reservoir through which the brake cylinder can be substantially completely vented upon the complete venting of auxiliary reservoir pressure, a check valve being arranged in this communication to prevent direct flow of fluid from the auxiliary reservoir to the brake cylinder, so as to not interfere with the ordinary operation of the brake equipment.

Other objects and advantages will appear in the following more detailed description of my invention.

In the accompanying drawing, the single figure is a diagrammatic view, mainly in section, of a fluid pressure brake equipment having my improvement applied thereto. For the purpose of illustration, I have shown my improvement applied to an equipment of the type disclosed in Fig. 1 of the pending application of C. C. Farmer, Serial No. 596,754, filed March 4, 1932.

As shown in the drawing, the fluid pressure brake equipment comprises a triple valve device 1 secured to one end of an auxiliary reservoir 2 and operative in accordance with variations in pressure in a brake pipe 3 for controlling the supply of fluid under pressure to and the release of fluid under pressure from a brake applying and releasing mechanism, which mechanism comprises a main brake cylinder 4 and a slack take-up cylinder 5. Inasmuch as the triple valve device and the cylinders are similar in construction and operation to the corresponding parts illustrated and described in detail in the aforementioned pending application, only so much of the construction and operation will be specifically described herein as is necessary to show the relation of the invention to the equipment to which it is applied.

The brake applying and releasing mechanism also includes a control valve device 6 which is similar in construction to that disclosed in the aforementioned pending application with the exception of the modification necessary to embody my invention.

The triple valve device comprises a casing secured to the auxiliary reservoir 2 and having a piston chamber 7 connected to the brake pipe 3 and containing a piston 8 adapted to operate a main slide valve 9 and an auxiliary slide valve 10 contained in a chamber 11 which is open to the auxiliary reservoir 2. The triple valve device is provided with the usual quick action mechanism comprising a fluid pressure vent valve 12, a piston 13 for actuating said vent valve, a check valve 14 and a spring 15 interposed between the vent valve 12 and the check valve 14 for seating said vent valve.

The triple valve device is further provided with the usual graduating stem 96 which is normally yieldingly maintained in the position shown in the drawing by means of a spring 16.

The brake cylinder 4 comprises the usual hollow cylinder closed at one end by a pressure head 43 and containing a piston 17 normally held in release position by means of a release spring 18 in the usual manner. The piston 17 is provided with the usual hollow piston rod 19 which carries a push rod 20. Disposed in the brake cylinder pressure head 43 is a release valve 98 having a fluted stem 99 extending into the brake cylinder and adapted to be engaged by the brake cylinder piston 17 for unseating said valve against the pressure of a spring 100.

Secured to the outer end of the push rod 20 is a latch device 21 of the type disclosed in the aforementioned pending application.

The slack take-up cylinder 5 contains a piston 22 normally held in the position shown in the drawing by means of a release spring 23. The piston 22 is provided with a hollow piston rod 24 in which is disposed a push rod 25, the outer end of which push rod is secured to one end of a brake lever 26. The brake lever 26 is provided with a fulcrum (not shown) about which said lever is adapted to be rotated in a clockwise direction to take up the slack in the brake rigging and to place the brake shoes in braking engagement with the car wheels in the usual well known manner.

The brake cylinder push rod 20 is connected to the lever 26 by means of a pin 27.

The auxiliary reservoir 2 is provided with the usual release valve device 28 comprising a casing having formed therein a valve chamber 29 which contains a valve 30 for controlling a passage 31 leading to the atmosphere. The valve 30 is normally maintained in the closed position against the annular seat rib 32 provided in said casing by means of a spring 33 disposed between said valve and a cap nut 34 having screw-threaded engagement with the casing for closing one end of the valve chamber 29. A lever 35 pivotally mounted, by means of a pivot 36, on a bracket 37 provided on the casing, engages the valve stem 39. A lever 40 pivotally mounted, by means of a pivot 41, on a bracket 42 formed on the casing, is adapted, upon being rotated, to engage and operate the lever 35 so as to move the valve 30 to the open position. The lever 40 is usually operated by a pull rod (not shown) which is accessible from the side of the car.

The control valve device 6 is preferably mounted on the pressure head 43 of the brake cylinder 4. Said device comprises a piston 44 having a stem 45 adapted to operate a slide valve 46 contained in a valve chamber 47. The piston 44 is provided on one side with a gasket 48 adapted at one time to effect a leak-proof seal with a seat rib 49 surrounding a chamber 61 which is continuously in communication with the auxiliary reservoir 2 through a passage and pipe 62. The piston 44 has at the opposite side a chamber 50 containing a valve member 51 carried by and movable with the stem 45. The valve member 51 is provided with a gasket 52 adapted normally to effect a leak-proof seal with a seat rib 53. Disposed in the outer end of the valve chamber 47 is a pressure exerting means for opposing upward movement of piston 44, said means comprising a plunger 54 and a spring 55 adapted to urge said plunger into engagement with the piston stem 45.

A vent valve piston 56 is provided in the control valve device and is normally pressed into engagement with a seat rib 57 by means of a spring 58 contained in a chamber 59 which is open to the atmosphere through a passage 60.

According to the invention, the control valve device is provided with a communication through which fluid under pressure is adapted to flow from chamber 50 to passage 62, said communication having means for preventing back flow therethrough. This communication comprises a passage 63 leading from chamber 50 and connecting with a passage 64 which in turn connects with passage 62, and interposed between the passages 63 and 64 are the series arranged check valves 65 and 66 for preventing back flow of fluid under pressure from passage 64 to passage 63. The check valve 66 is subject to the pressure of a light spring 67 which is provided for seating said check valve upon the substantial equalization of pressures acting on opposite sides thereof. Preferably contained in said communication, in the present instance in passage 64, is a choke 68.

In operation, to initially charge the equipment with fluid under pressure, fluid under pressure is supplied to the brake pipe 3 in the usual manner and flows from thence through chamber 69 in the triple valve device 1, passage 70, chamber 71 and a plurality of ports 72 to the triple valve piston chamber 7.

Assuming the parts of the triple valve device 1 to be in release position, as shown in the drawing, fluid under pressure flows from chamber 7 through a feed groove 73 to valve chamber 11 and from thence to the auxiliary reservoir 2, thereby charging said reservoir to brake pipe pressure.

With the triple valve parts in release position, pressure chamber 74 at the right hand side of the brake cylinder piston 17 is vented to the atmosphere through passage 75, past a release check valve 76, through passage and pipe 77, passage 78 in the triple valve device, cavity 79 in the triple valve slide valve 9, and atmospheric passage 80.

The parts of the control valve device 6 are normally maintained in the position shown in the drawing by auxiliary reservoir pressure acting in chamber 50 on the valve member 51, said chamber being supplied with fluid from the auxiliary reservoir by way of pipe and passage 62, chamber 61, piston chamber 81 and a passage 82 containing a choke 83.

With the control valve device in the normal position, the pressure chamber 84 at one side of the slack take-up piston 22 is vented to the atmosphere by way of pipe and passage 85, valve chamber 47 of the control valve device and through passage and pipe 77 leading to the triple valve device 1.

When brake pipe pressure is reduced at an emergency rate, as when the brake pipe hose connection (not shown) on a car being set out of a train is broken, with the adjacent angle cock on said car open, the triple valve device is caused to operate in the well known manner to vent fluid from the brake pipe 3 to the brake cylinder passage 77 and to supply fluid from the auxiliary reservoir 2 through the emergency port 86 in the slide valve 9 and thence through passage 78 to passage 77. From passage 77 fluid flows through pipe and passage 77 in the control valve device 6 to valve chamber 47 and from thence through passage and pipe 85 to chamber 84 in the slack take-up cylinder 5.

The pressure of the fluid thus supplied through valve chamber 47 of the control valve device to piston chamber 84 of the take-up cylinder 5 moves the take-up piston 22 outwardly against the opposing pressure of the release spring 23. This outward movement of piston 22 actuates the push rod 25 to turn the brake lever 26 in a clockwise direction about its fulcrum (not shown), so as to take up the looseness or slack in the brake rigging and to move the usual brake shoes into contact with the car wheels.

Since pin 27 in the brake lever 26 connects the brake cylinder push rod 20 to said lever, said push rod is pulled outwardly of the hollow piston rod 19 upon rotation of lever 26 by movement of the take-up cylinder piston 22.

It will be observed that the vent valve piston 56 is pressed into engagement with the seat rib 57 by means of the spring 58 and that the seated area of said valve piston outside of said seat rib is open to the atmospheric passage 60 through a passage 89 and is also in communication through a passage 90 with the seat of the control valve slide valve 46. With the vent valve piston 56 thus in sealing engagement with the seat rib 57, the brake cylinder piston chamber 74 is connected to the atmosphere through passage 75, cavity 87 in slide valve 46, passages 90 and 89 and the atmospheric passage 60, so as to prevent operation of the brake cylinder piston 17 before intended, due to possible leakage from valve chamber 47 to the brake cylinder piston chamber 74.

The valve member 51 being subject on one side to auxiliary reservoir pressure as supplied to chamber 50 from passage 62 through piston chamber 61 and passage 82 containing the choke 83, and being subject, within the seat rib 53, to the pressure of fluid in the take-up cylinder, when a predetermined pressure is obtained in said cylinder, the combined pressure of the spring 55 and the pressure of fluid supplied to the valve chamber 47 will exceed the opposing auxiliary reservoir pressure in chamber 50, and the valve member 51 will then be moved from engagement with seat rib 53, which permits the pressure in chamber 50 to substantially equalize with the take-up cylinder pressure in valve chamber 47, after which the take-up cylinder pressure acts on one side of piston 44, which is subject on the other side to auxiliary reservoir pressure in chamber 81. The area of piston 44 being less than the area defined by the seat rib 53 on the valve member 51, the pressure opposing movement of the parts toward the seat rib 49 is less after the valve member moves from engagement with the seat rib 53. As a consequence, the spring 55 is permitted to promptly and positively move the parts to the opposite position, in which the piston 44 engages and seats on the seat rib 49. With the piston 44 engaging seat rib 49, the area subject to auxiliary reservoir pressure is reduced to that within said seat rib, while the area outside of said seat rib is subject to the take-up cylinder pressure in chamber 50 due to the equalization of pressures through the passage 82. As a result, the pressure opposing the pressure of spring 55 and take-up cylinder pressure acting in chamber 50 is further reduced so as to positively insure the parts remaining in their lower position.

With the parts of the control valve device in their lower position, passage 77 is connected through a cavity 87 in the slide valve 46 to passage 75 leading to the brake cylinder piston chamber 74, thereby permitting fluid supplied by the triple valve device to passage 77 to flow to said chamber and act on piston 17, causing said piston to move outwardly and permit the latch device to operate, in the manner described in the aforementioned pending application, so that the outward movement of said piston will cause pressure to be applied to the brake lever 26 for pushing the brake shoes against the car wheels in accordance with the pressure acting in piston chamber 74.

Fluid supplied to the piston chamber 74 through the passage 75 flows also to the seated area of the vent valve piston 56 within the seat rib 57 through passage 92 and promptly moves said valve piston upwardly against the opposing pressure of spring 58 and into sealing engagement with a gasket 88, so as to prevent loss of fluid which might possibly leak into passage 89.

In order to release the brakes on the car set out of the train, the trainman operates the lever 40 of the auxiliary reservoir release valve 28 so that the lever 35 will be operated to unseat the release valve 30 and thereby permit the venting of fluid under pressure from the auxiliary reservoir 2 to the atmosphere through pipe 91, chamber 29, past the unseated valve 30, to chamber 93, and thence through the atmospheric passage 31.

Fluid under pressure is vented from the valve chamber 47 to the auxiliary reservoir 2 by way of passage 63, past the check valves 65 and 66, and through passage 64 and passage and pipe 62. The venting of the valve chamber 47 permits the venting of the piston chambers 84 and 74, since the piston chamber 84 is connected to said valve chamber by way of passage and pipe 85 and the piston chamber 74 is in communication with said valve chamber by way of passage 75, past check valve 95 and through passage 94.

The triple valve device being in emergency position, fluid under pressure is also vented from the piston chamber 74 to the auxiliary reservoir 2 by back flow through passage 75, cavity 87 in slide valve 46, passage and pipe 77, passage 78, emergency port 86 and valve chamber 11. At the same time, fluid is vented from piston chamber 74 through passage 75, past the check valve 76 and through passage 77.

When the auxiliary reservoir pressure has been reduced to a degree sufficient to permit the spring 16, acting through the stop 96, to move the piston 8, the parts will be moved back to a lap position, in which the passage 78 is lapped by the slide valve 9, so that the flow of fluid under pressure from the brake cylinder piston chamber 74 to the auxiliary reservoir 2 through the triple valve device is cut off. However, fluid under pressure will continue to be vented from the brake cylinder and from the take-up cylinder past the check valves 65 and 66 into the auxiliary reservoir 2, in the manner above described, until the fluid is substantially completely vented from said cylinders.

Venting of the brake cylinder and of the take-up cylinder as above described permits the respective release springs 18 and 23 to move the pistons 17 and 22, respectively, to the release positions and thereby release the brakes.

The check valves 65 and 66 are provided to prevent flow of fluid under pressure from passage 62, which leads to the auxiliary reservoir, to the take-up cylinder through passage 64, choke 68, passage 63, chambers 50 and 47, and passage and pipe 85 when less than a full service reduction in brake pipe pressure is being effected and with the control valve piston 44, valve 51 and slide valve 46 in their lower positions. With the control valve parts in the normal position, as shown in the drawing, when an application of the brakes is effected, fluid under pressure is supplied from the auxiliary reservoir through the triple valve device to passage 77 in the control valve device and thence through valve chamber 47 and passage and pipe 85 to the take-up cylinder, in the manner described in the aforementioned pending application. When the take-up cylinder pressure has been built up to about 51 pounds, assuming that a normal brake pipe pressure of 70 pounds is carried, the control valve piston 44, valve 51 and slide valve 46 are shifted to their lower positions in which communication is cut off from passage 77 to chamber 47, and consequently to passage 85, and in which communication is established between passage 77 and the brake cylinder passage 75 through cavity 87 in slide valve 46, through which communication fluid under pressure is supplied to the brake cylinder 4. If only a light reduction in brake pipe pressure is effected, the pressure of the fluid in the auxiliary reservoir, when the triple valve device is moved to lap position, may be higher than the pressure of the fluid in the take-up cylinder, in which event, if the check valves 65 and 66 were not provided, fluid under pressure would flow from the auxiliary reservoir to the take-up cylinder through passage and pipe 62, passage 64, choke 68, passage 63, chambers 50 and 47, and passage and pipe 85. The consequent reduction in auxiliary reservoir pressure would probably result in the triple valve device being moved from lap position to release position and thereby effect an unintended release of the brakes.

A further object of the check valves 65 and 66 is to prevent loss of fluid under pressure from the auxiliary reservoir when the equipment is being initially charged. In an uncharged equipment, the control valve parts are in their lower positions, in which communication is established from chamber 50 to valve chamber 47 and from passage 97 to chamber 47. When the equipment is being initially charged, if the check valves 65 and 66 were not provided, fluid under pressure supplied through the triple valve device to the auxiliary reservoir in the usual manner would flow therefrom to the atmosphere through the pipe and passage 62, passage 64, choke 68, passage 63, chambers 50 and 47, passage 97, past the unseated release valve 98, piston chamber 74, passage 75, cavity 87 in slide valve 46, passage and pipe 77, passage 78 in the triple valve device, cavity 79 in slide valve 9 and atmospheric passage 80.

The choke 68 is provided to limit the rate of flow of fluid under pressure from the auxiliary reservoir to the atmosphere in the event that both check valves 65 and 66 are held unseated, as by dirt lodged on the seats, while the equipment is being initially charged. When the equipment is being initially charged, the control valve parts being in their lower positions, if the check valves 65 and 66 were unseated, fluid under pressure supplied through the triple valve device to the auxiliary reservoir would flow therefrom to the atmosphere through pipe and passage 62, passage 64, choke 68, past the unseated check valves 65 and 66, through passage 63, valve chamber 47, passage 97, past the unseated release valve 98, piston chamber 74, passage 75, cavity 87 in slide valve 46, passage and pipe 77, passage 78 in the triple valve device, cavity 79 in the slide valve 9 and the atmospheric passage 80.

It is apparent from the foregoing that I have provided, in a fluid pressure brake equipment of the type disclosed in the aforementioned application, means whereby the brake cylinder and the take-up cylinder may be substantially completely released on a car set out of a train through the usual auxiliary reservoir release valve.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, a brake cylinder, and an auxiliary reservoir, of a brake controlling valve device movable upon a reduction in brake pipe pressure to an application position for supplying fluid under pressure from said auxiliary reservoir to said brake cylinder and movable upon an increase in brake pipe pressure to a release position for releasing fluid under pressure from said brake cylinder and having associated therewith a direct communication from said brake cylinder to said reservoir, means for preventing back flow through said communication from said reservoir to said brake cylinder, a choke in said communication for limiting the back flow therethrough of fluid under pressure from said reservoir in the event of failure of said means when said brake controlling valve device is in release position, and manually operable means for venting fluid from said reservoir, and thereby from said brake cylinder through said communication.

2. In a fluid pressure brake, the combination with a brake pipe, a brake cylinder, an auxiliary reservoir and a brake controlling valve device movable upon a reduction in brake pipe pressure to an application position in which fluid under pressure is supplied from said reservoir to a passage adapted to be connected to said brake cylinder and movable upon an increase in brake pipe pressure to a release position in which said passage is vented, of valve means for controlling communication from said passage to a passage communicating with said brake cylinder and having a passage communicating directly with said reservoir and having a position in which said passages communicate with one another, a check valve in the last mentioned passage for preventing back flow therethrough from said reservoir to said valve means, a choke in the last mentioned passage for limiting the flow therethrough in the event of failure of said check valve, and manually operable means for venting fluid from said reservoir and thereby from said brake cylinder through the last mentioned passage.

3. In a fluid pressure brake, the combination with a brake pipe, a plurality of brake cylinders, an auxiliary reservoir and a brake controlling valve device operative upon a reduction in brake pipe pressure to supply fluid under pressure from said reservoir to said brake cylinders, valve means controlled by the pressure of fluid in one of said cylinders for establishing communication through which fluid under pressure is supplied first to one of said brake cylinders and then to another of said brake cylinders for effecting successive operation of said brake cylinders and operative in the position in which fluid under pressure is supplied to the last mentioned brake cylinder to establish communication from said brake cylinders to said reservoir, a check valve in the last mentioned communication for preventing back flow therethrough, a choke in the last mentioned communication for limiting the flow therethrough in the event of failure of said check valve, and manually operable means for venting fluid under pressure from said reservoir, and thereby from said brake cylinders through the last mentioned communication.

EARLE S. COOK.